United States Patent [19]
Volpi et al.

[11] Patent Number: 5,347,284
[45] Date of Patent: Sep. 13, 1994

[54] SYSTEM AND METHOD FOR A DIGITAL NAVIGATION SATELLITE RECEIVER

[75] Inventors: John P. Volpi, Garland; Leonard J. LaPadula, III, Carrollton; Chyi H. Lu, Plano, all of Tex.; Hugh L. Scott, Colorado Springs, Colo.; Mitchel B. Stiles, Plano, Tex.; David W. Rekieta, Allen, Tex.

[73] Assignee: Texas Instruments Incorporated, Dallas, Tex.

[21] Appl. No.: 662,585

[22] Filed: Feb. 28, 1991

[51] Int. Cl.$^5$ .............. H04B 7/19; H04B 15/00; G01S 13/00
[52] U.S. Cl. ................... 342/356; 342/92; 375/1
[58] Field of Search ............ 342/352, 356, 357, 92; 371/37.9; 375/1

[56] References Cited

U.S. PATENT DOCUMENTS

| | | | |
|---|---|---|---|
| 3,609,682 | 9/1971 | Mitchell | 371/37.9 |
| 4,468,793 | 8/1984 | Johnson et al. | 375/97 |
| 4,578,678 | 3/1986 | Hurd | 342/357 |
| 4,701,934 | 10/1987 | Jasper | 342/357 |
| 4,821,294 | 4/1989 | Thomas, Jr. | 342/352 |
| 4,998,071 | 5/1991 | Strid et al. | 324/613 |
| 5,101,416 | 3/1992 | Fenton et al. | 342/357 |
| 5,223,843 | 6/1993 | Hutchinson | 342/352 |

FOREIGN PATENT DOCUMENTS 2155268 9/1985 United Kingdom .

OTHER PUBLICATIONS

"Low Cost Dynamic Testing of GPS Receivers", by Volpi et al., Texas Instruments Incorporated, pp. 1–8.
"TI420 Position/Navigation System Product Specification," Texas Instruments Incorporated, May 15, 1988 (Revision C).

*Primary Examiner*—Gregory C. Issing
*Attorney, Agent, or Firm*—René E. Grossman; Richard L. Donaldson

[57] ABSTRACT

There is disclosed a global positioning system receiver method and system which converts the analog signals to digital signals prior to performing signal acquisition and GPS unique processing functions. The A/D converter uses full null zone processing to increase anti-jamming capability and 4-level output to reduce signal processing. A single analog and digital channel is used for both the L1 and L2 channels as well as for all P(Y)-code and C/A-code thus allowing full multi channel tracking with several channels each tracking a separate signal while the remainder of the channels rove over all of the signals on the alternate L-band with programmable duty cycles. The system allows for Y-code substitution for P-code by multiplexing a portion of the Y-code generated between multiple channels.

25 Claims, 12 Drawing Sheets

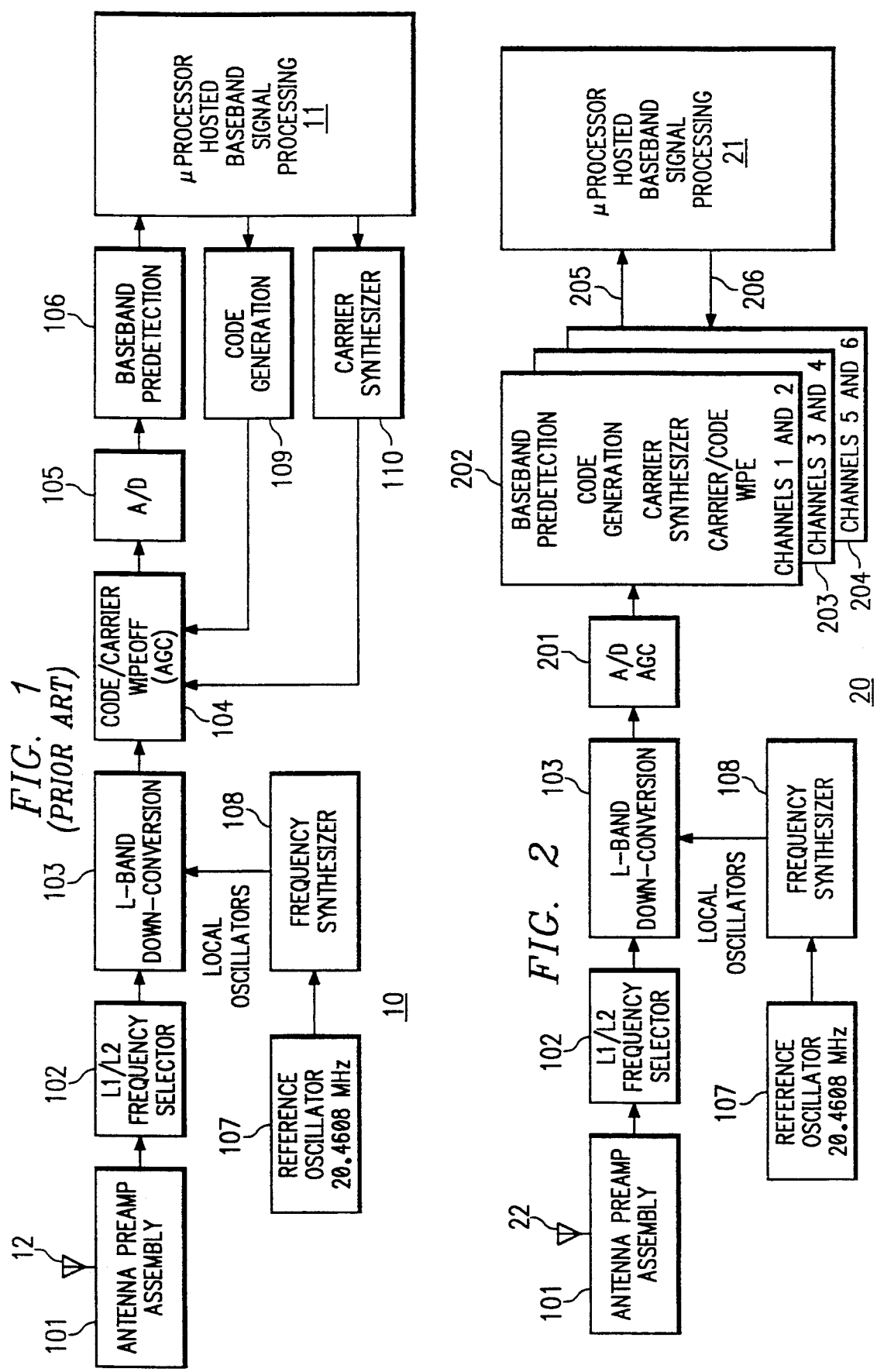

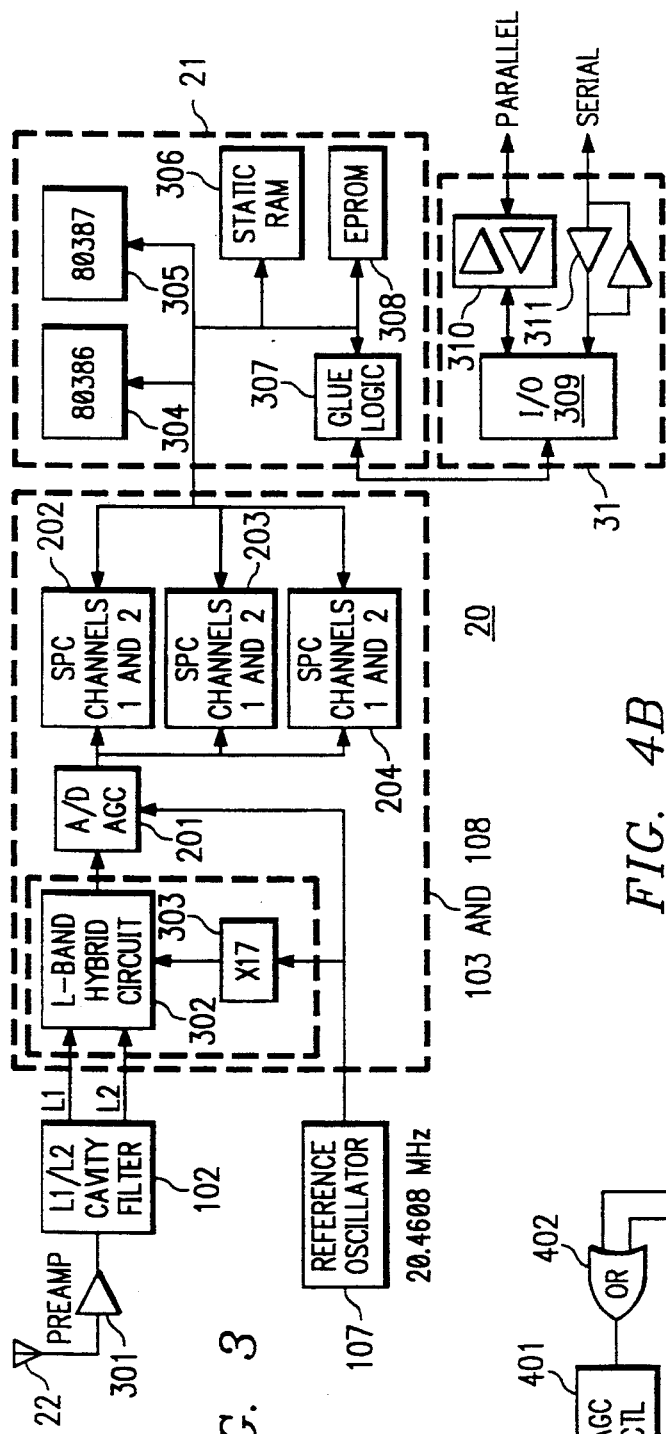
FIG. 3
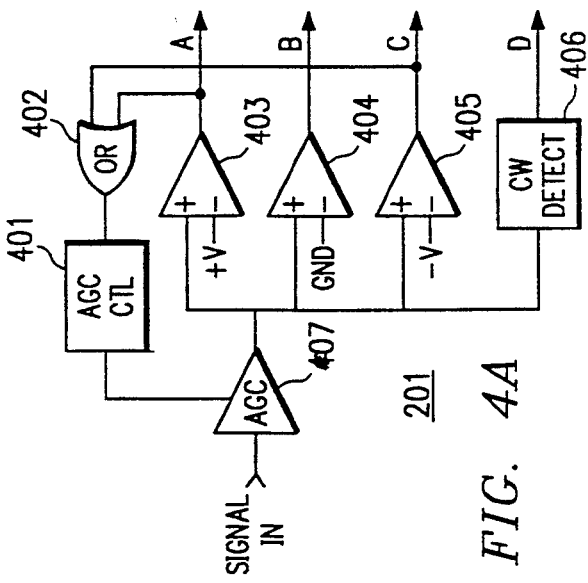
FIG. 4B
FIG. 4A

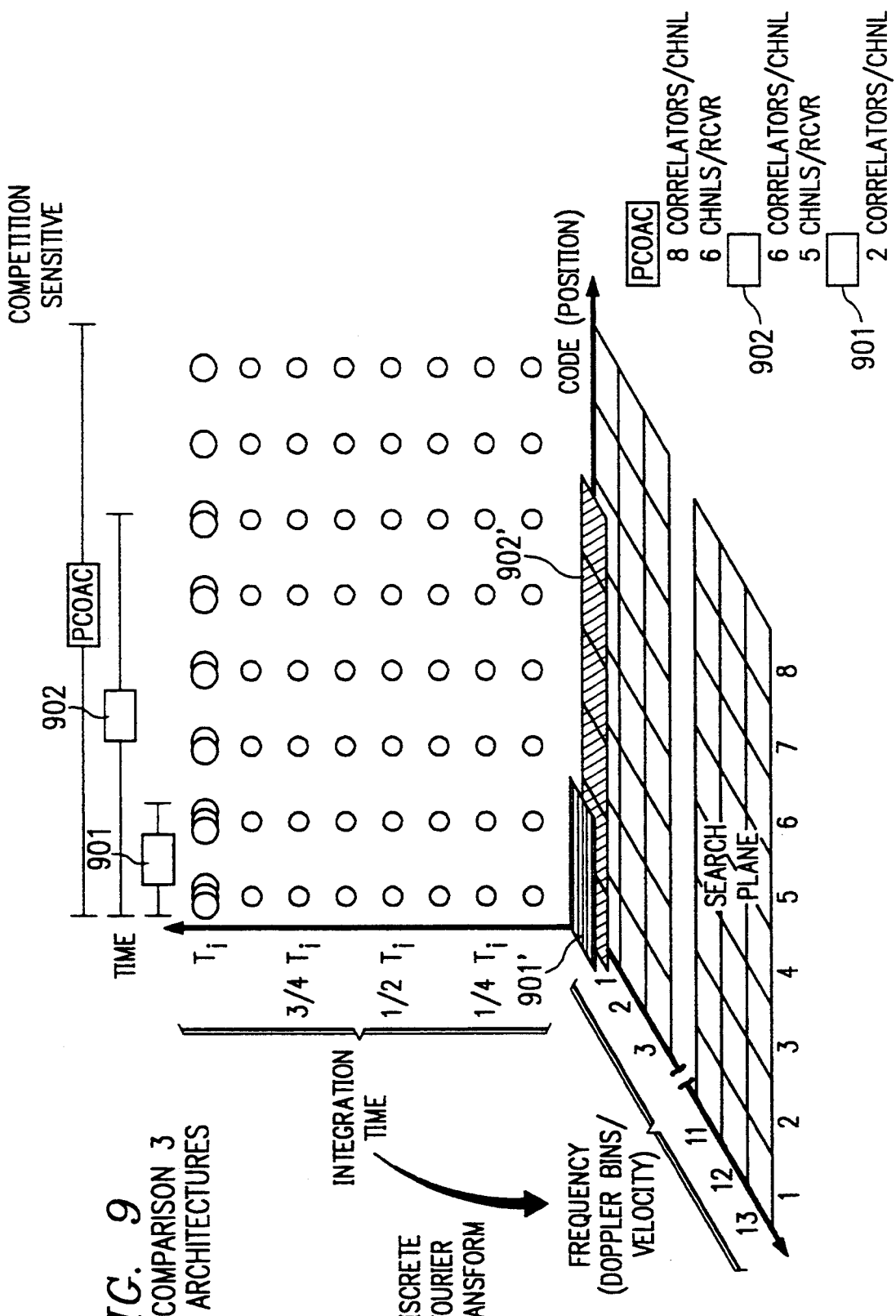

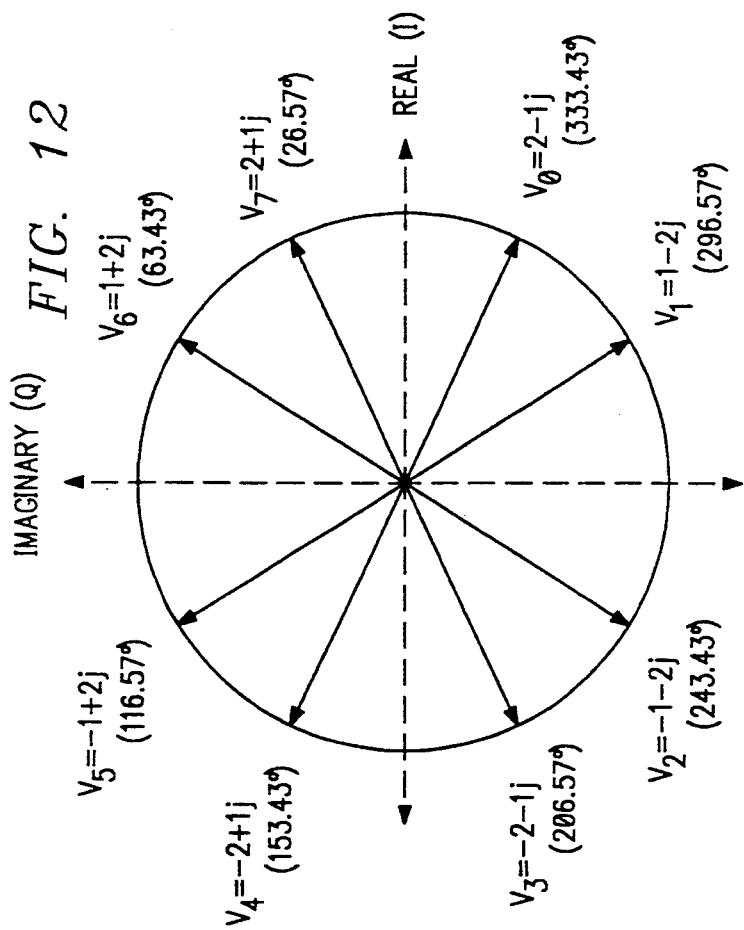
FIG. 12
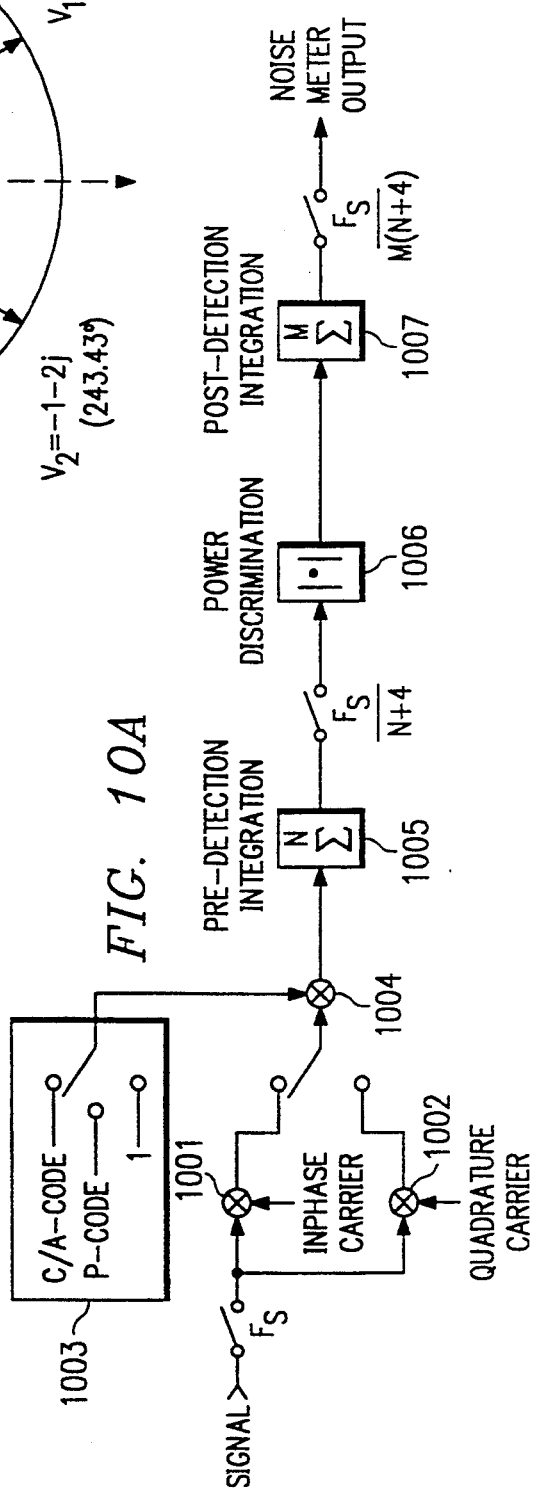
FIG. 10B
TYPICAL PRE-DETECTION INTEGRATION PERIODS
FIG. 10A

8-POINT DFT GAIN
(INCLUDES DOPPLER ATTENUATION EFFECT)

DFT C/NO LOSS
(INCLUDES DOPPLER ATTENUATION EFFECT)

FIG. 16

ENVELOPE MAGNITUDE AND C/No. LOSS

| CAUSE | | EFFECT ON MAGNITUDE | | EFFECT TO C/No. (dB) |
|---|---|---|---|---|
| | | SIGNAL | NOISE | |
| CARRIER HARD-LIMITING | ON | 1.00 | 1.00 | 0.00 |
| | OFF | 1.50 | 1.50 | 0.00 |
| 9-BIT TRUNCATION | | 1/512 | 1/512 | 0.00 |
| INTEGRATION PERIOD | | $n$ | $n^{.5}$ | 0.00 |
| ADJACENT CORR PRESUMMING | OFF | 0.75 to 1.00 | 1.00 | -2.50 to 0.00 |
| | ON | 1.00 | 1.15 | -1.25 |
| ENVELOPE CALCULATION | | 1.09 | 1.12 | -0.24 |

| EIGHT-POINT DFT | | | | |
|---|---|---|---|---|
| BIN | FREQUENCY OFFSET | | | |
| 12 | -.413/T to -.339/T | 11.3 to 14.0 | 6.32 | -4.0 to -2.1 |
| 11 | -.339/T to -.286/T | 17.7 to 19.1 | 8.94 | -3.1 to -2.4 |
| 10 | -.286/T to -.214/T | 13.5 to 16.1 | 6.32 | -2.4 to -0.9 |
| 9 | -.214/T to -.164/T | 19.9 to 21.1 | 8.94 | -2.1 to -1.5 |
| 8 | -.164/T to -.089/T | 14.6 to 17.3 | 6.32 | -1.8 to -0.3 |
| 7 | -.089/T to -.036/T | 21.2 to 22.3 | 8.94 | -1.5 to -1.1 |
| 6 | -.036/T to .036/T | 15.5 to 17.8 | 6.32 | -1.2 to 0.0 |
| 5 | .036/T to .088/T | 21.4 to 22.3 | 8.94 | -1.4 to -1.1 |
| 4 | .088/T to .161/T | 14.7 to 17.4 | 6.32 | -1.7 to -0.2 |
| 3 | .161/T to .214/T | 19.9 to 21.1 | 8.94 | -2.1 to -1.5 |
| 2 | .214/T to .286/T | 13.5 to 16.1 | 6.32 | -2.4 to -0.9 |
| 1 | .286/T to .336/T | 17.9 to 19.1 | 8.94 | -3.0 to -2.4 |
| 0 | .336/T to .411/T | 11.4 to 14.0 | 6.32 | -4.0 to -2.1 |

| FOUR-POINT DFT | | | | |
|---|---|---|---|---|
| BIN | FREQUENCY OFFSET | | | |
| 12 | -.413/T to -.313/T | 4.1 to 7.0 | 4.47 | -6.8 to -2.1 |
| 10 | -.313/T to -.118/T | 4.8 to 8.0 | 4.47 | -5.4 to -0.9 |
| 8 | -.188/T to -.063/T | 5.4 to 8.7 | 4.47 | -4.4 to -0.3 |
| 6 | -.063/T to .063/T | 5.7 to 8.9 | 4.47 | -4.0 to 0.0 |
| 4 | .063/T to .118/T | 5.4 to 8.7 | 4.47 | -4.4 to -0.2 |
| 2 | .118/T to .312/T | 4.8 to 8.0 | 4.47 | -5.4 to -0.9 |
| 0 | .312/T to .411/T | 4.1 to 7.0 | 4.47 | -6.8 to -2.1 |

NOTE: $n$ IS THE NUMBER OF REFERENCE CLOCK PERIODS IN AN INTEGRATION PERIOD AND T IS THE INTEGRATION CLOCK PERIOD.

TIME TO FIRST FIX VS AIDING QUALITY, RECEIVER TYPE, AND JAMMING

SYSTEM AND METHOD FOR A DIGITAL NAVIGATION SATELLITE RECEIVER

TECHNICAL FIELD OF THE INVENTION

This invention relates to navigation satellite receivers, and more particularly to a digital receiver having rapid signal acquisition.

BACKGROUND OF THE INVENTION

The Navstar Global Positioning System (GPS) is used to determine exact geographic position (i.e., latitude, longitude and height above the earth) absolute velocity, as well as the exact time. The navigation device, receiver, must calculate the position velocity and the time by determining distance and relative velocity to a series of satellites. The velocity of the receiver is calculated from the doppler frequency shift of signals transmitted from space while the exact position of the receiver is calculated from the time shift of data due to the distance the signals must travel from the satellite. This distance is called range and the doppler shift yields range rate.

A GPS receiver must receive signals generated from a satellite about 11,000 miles away. A GPS satellite transmits about 6 watts spread spectrum signal. The satellite and receiver, employ spread spectrum techniques to differentiate the signal from the noise. "Spread spectrum" means that as time passes, the frequency at which a signal is being transmitted will change or the instantaneous phase at which the signal is being transmitted will change. Using correlation techniques, the satellite receiver can match the spread spectrum signal coming from the satellite with an image of the signal that the receiver attempts to estimate. A precise match of the satellite's spread spectrum signal produces a potential signal processing gain of up to 53 decibels. The use of spread spectrum techniques is essential to receive 6 watts of energy transmitted 11,000 miles away. At the antenna, the GPS signal is about 20 dB below ambient cosmic noise.

Using the GPS system, four transmitting satellites are required, to solve for the three spatial dimensions and time. The basic method of determining position is knowing the time difference from each of the satellites. The time difference for each satellite is the time required for a signal initiated at the satellite to be received by the user. Therefore, at least four satellites must be tracked. This is accomplished ideally by the use of at least four hardware receiver channels.

Classically and historically, receiver channels have been large, power hungry and expensive. While this gives the best performance, it costs a lot of money. The lowest cost approach uses sequential tracking. Under sequential tracking, there is one receiver channel that sequences across multiple satellites—tracking each satellite for a predetermined period of time, and then tracking another satellite, etc. Sequential tracking requires the minimum hardware, but also has the lowest performance characteristics.

There has been developed a multiplex technique which was essentially a compromise between using four receiver channels and using purely sequential tracking. This technique sequences very quickly across four satellites. This provides the dynamic capability of a continuous track receiver, but has a serious signal strength penalty under jamming conditions. The present state of the art requires a choice between either large and expensive receivers for high performance, or small and more affordable sequential tracking, with a severe compromise in performance.

Therefore, a need exists for a receiver that is small and affordable, yet with no compromise in performance.

A further need exists in the art for a GPS receiver that achieves enhanced performance under diabolical conditions, such as jamming and fast acquisition.

A still further need exists in the art for a receiver having simultaneous C/A and P or Y-code (P(Y)-code) capability while reducing the parts count and enhancing signal acquisition time.

SUMMARY OF THE INVENTION

The foregoing requirements have been met in this invention by a system and method which converts the analog signal to digital prior to processing the signal for detection purposes and which extends the prior use of channels on a chip. The receiver has rapid acquisition with high performance and anti-jamming capability with respect to the P(Y)-code as well as the C/A-code.

Each GPS satellite generates two spread spectrum signals centered around separate frequencies. The L1 channel is centered around 1575.42 megahertz, and has C/A-code, and P(Y)-code and data modulated on it. C/A-code has a 1.023 megahertz chipping rate with a bandwidth of about two megahertz, and P(Y)-code has a 10.23 megahertz chipping rate with a bandwidth of about 20 megahertz. The L2 channel is centered around 1227.6 megahertz and only has P(Y)-code and data modulated on it. Data provides information about the satellite's orbit and health and information about other satellites in the GPS constellation.

An existing digital receiver was designed using only C/A-code primarily because of semiconductor technology that was available at that time. In order to design second generation or P(Y)-code receiver, advantage was taken of the higher signal processing speeds in silicon. One objective was to make the parts count lower while also achieving rapid signal acquisition. These objectives have been achieved thereby significantly reducing the processor loading requirements during signal search. In addition, the receiver was designed using modular concepts such that approximately 70 percent of the GPS receiver uses common circuitry for several receiver applications.

In using the digital signal acquisition technique, advantage was taken of null zone automatic gain control in the analog to digital converter (A/D) to increase jamming immunity. The output from the A/D uses four level coding, thereby further reducing processing time.

One technical advantage of our invention is that a GPS receiver is designed having a method and system for converting the analog signal to the digital equivalent prior to processing the signal for acquisition purposes.

A further technical advantage of our receiver is that the processing time is reduced thereby allowing for faster signal acquisition during the signal search mode.

A still further technical advantage of our invention is that the part count of the GPS receiver is reduced and the system is designed using modular blocks which are interchangeable with many different types of receivers and for receivers used for different applications.

BRIEF DESCRIPTION OF THE DRAWINGS

A more complete understanding of the present invention may be acquired by referring to the detailed description and claims when considered in connection with the accompanying drawings in which like reference numbers indicate like features wherein:

FIG. 1 show a prior art navigation receiver;

FIG. 2 shows the navigation receiver of the present invention;

FIG. 3 shows a more detailed block diagram of one configuration of the present receiver;

FIGS. 4a, 4b, 4c and 5 show details of null zone detector;

FIG. 9 shows a chart for discussion purposes relative to the receiver search and acquisition function;

FIGS. 10a and 10b show details of the wide band noise meter;

FIG. 12 shows complex vectors for the DFT circuit.

FIGS. 14, 15 and 16 show charts and data with respect to the discrete fourier transformer and the envelope detection;

DETAILED DESCRIPTION OF THE INVENTION

Figure 4C:
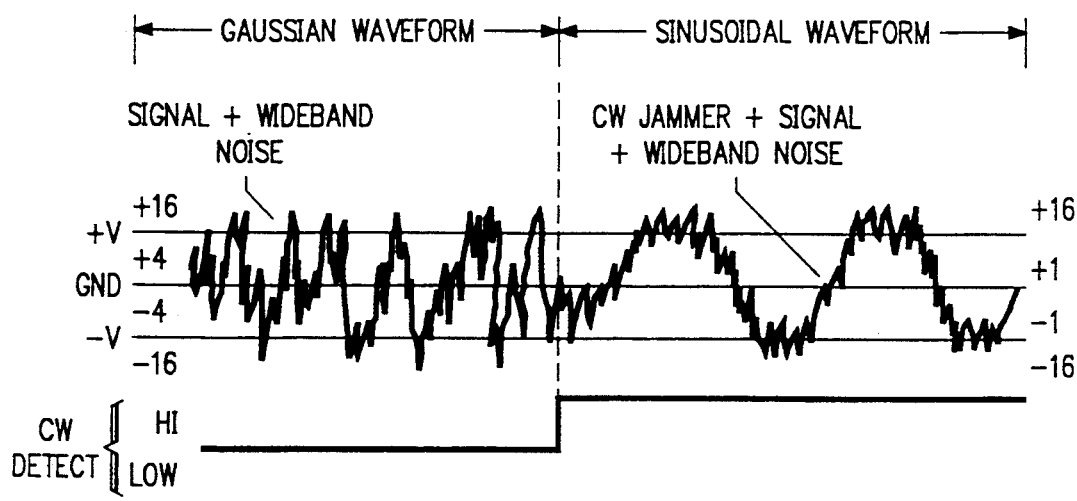

FIG. 1 shows prior art receiver 10 having antenna 12 which feeds into antenna preamp assembly 101. This is followed by L1/L2 frequency selector 102 and L-band downconversion 103 which converts either the L1 signal or the L2 signal to a second IF frequency. The local oscillators for the down-conversion are provided by reference oscillator 107 and frequency synthesizer 108. The second IF (output from conversion 103) goes into analog circuit 104 for code and carrier wipe off. This is where the code transmitted by the satellite is compared and matched with the receiver's estimate of the code, and the carrier is compared with the receiver's estimate of the carrier.

Carrier frequency changes as a function of doppler velocity between the satellite and the user, and is the way the GPS measures relative velocity. Code generation 109 and carrier synthesizer 110 feed the code and carrier to the code/carrier wipe off circuitry and operate under control of computer 11.

After code and carrier wipe off, the signal is digitized in analog to digital (A/D) converter 105 and base band detected in module 106. The output of the base band predetection comprises the estimate of the error between the code and carrier that is transmitted from the satellite and the code and carrier prediction that is being made by the receiver. The error signal from the base band predetection to microprocessor 11 is used to generate new code and carrier states in modules 109 and 110. The key point is that significant signal processing is occurring in the analog domain, specifically code and carrier wipe off 104.

For a more complete understanding of the typical receiver system reference is made to U.S. Pat. No. 4,468,793 dated Aug. 28, 1984, entitled "Global Position System (GPS) Multiplexed Receiver," which reference is hereby incorporated by reference herein.

Turning now to FIG. 2, there is shown receiver 20 which utilizes antenna 22 feeding into antenna preamp assembly 101 which in turn feeds into L1/L2 frequency selector 102, which in turn feeds into L-band down conversion 103, all operating under control of reference oscillator 107 and frequency synthesizer 108 in the same manner as similar numbered modules of receiver 10 of the prior art shown in FIG. 1.

The output of L-band down conversion 103 is provided to analog to digital (A/D) AGC circuit 201 which is different from the A/D circuit in FIG. 1. A/D circuit 201 employs a null zone Automatic Gain Control (AGC) technique which provides added immunity against jamming. The A/D converter provides a four level output signal to signal processing circuits 202, 203 and 204. Note that circuits 202, 203 and 204 are replicas of the same chip and are detailed in concurrently filed copending patent application U.S. Ser. No. 07/663,968 entitled "Method and System for a Multi Channel and Search Global Position System Signal Processor," which is hereby incorporated by reference herein.

The outputs of circuits 202, 203 and 204 are shown as signals 205 going to processor computer 21. They are similar to the outputs of FIG. 1 going to processor 11 in that they represent the error between the receiver's estimate of code and carrier phase and the actual code and carrier phase being received. Signal 206 is the control from processor 21 back to circuits 202, 203, and 204, where the computer is directing the circuits to change their code and carrier estimates, as well as mode control of these chips.

Modules 101, 102 and 103 contain circuitry common with that found in a good FM radio. At circuit element 201 we have added null zone processing, which takes advantage of the spectral characteristics of the GPS signal and the spectral characteristics of the most common GPS jamming signals, which are CW signals. The null zone circuitry is desensitized to process CW energy, thereby yielding up to a 9 dB improvement in jamming immunity against CW jammers.

Circuit elements 202, 203 and 204 perform channel signal processing with no signal differentiation occurring prior to these circuit elements. Each element uniquely and completely generates carrier estimates, code estimates, base band predetection estimates and contains all the correlators for signal processing, and provides autonomous signal search capability for two satellites. Each circuit element also has the capability to simultaneously track both the C/A-code signal and the P(Y)-code signal within a single channel from a single satellite, effectively giving about a 4 dB improvement in signal strength over tracking P(Y)-code only.

FIG. 3 shows a block diagram containing more detail of system 20 showing one implementation of the receiver. Note that modules 103 and 108 have been combined into a single block consisting of L-band hybrid circuit 302 and times 17 circuit 303. The exact arrangement of this circuit is dependent upon the arrangement of the various components, and this could be one circuit or multiple separate pieces and is driven by specific application requirements.

It should be noted that reference oscillator 107 operates at an off beat frequency of 20.4608 megahertz or 2×10.2304 megahertz. Conventional GPS reference frequency is 10.2300 megahertz. It is the frequency offset (in this case 400 Hz) that allows us to implement 5 digital oscillators inside channels 202, 203 and 204.

Processor 21 is an implementation of the computer using the Intel chip set such that element 304 is an Intel 80386 and element 305 is an Intel 80387 floating point unit. The computer also includes static RAM 306, EPROM 308 where the program code is stored, and interface and glue logic 307. Glue logic provides address decode functions, interrupt control functions, DMA functions, and miscellaneous housekeeping required for the computer. Element 31 provides the input output reference between the GPS core receiver and the rest of the world.

Element 31 has an I/O function 309, bus drivers 310 for parallel I/O and serial drivers 311 for a serial I/O.

FIGS. 4A–4C show aspects of the null zone A to D converter (201, FIG. 3).

FIG. 4A shows the functional implementation of the null zone technique with 4 bit outputs A, B, C and D.

FIG. 4B is a truth table for the outputs of FIG. 4A, and FIG. 4C shows the difference in spectral content between a gaussian wave form and a sinusoidal wave form. The sinusoidal wave form is what you see when a CW jammer is incoming along with the GPS signal.

The advanced A/D conversion process shown in FIG. 4A is a modified version of a scheme called null-zone detection and was adapted for use for two reasons:

Reduction in the number of digital data bits being processed, which substantially decrease the size and power consumption of the processor, making it more reliable and much less expensive; and Additional resistance against constant envelope or continuous wave (CW) interference. CW jamming can be particularly troublesome during signal acquisitions on the C/A-code.

FIG. 4A shows the different aspects of the A/D conversion process. Automatic gain control (AGC) circuit 401 maintains the raw incoming analog signal at a constant level. Three threshold detectors 403–405 quantize the incoming voltage into one of four values. When the incoming waveform's probability distribution function is gaussian in shape, as would be the case for broadband noise, the four values are assigned weights of −16, −4, +4, +16. This weighting approximates a linear detector. The automatic gain control (AGC) maintains the percentage of ±16 values as a constant.

A separate detector 406 determines if the signal is, indeed, gaussian or if it has a strong CW component. The probability distribution function of these two cases is very different. If a strong CW component exists, then a waveform with equivalent power will spend a larger percentage of time near the high and low thresholds. The CW detector senses this condition, and the weights applied to the four values change to −16, −1, +1, +16. The ±1 values deemphasize signal between the high and low thresholds where less GPS signal can be extracted. The waveform straddling the high and low thresholds is rich in GPS signal and maintains full weighting.

Figure 5:
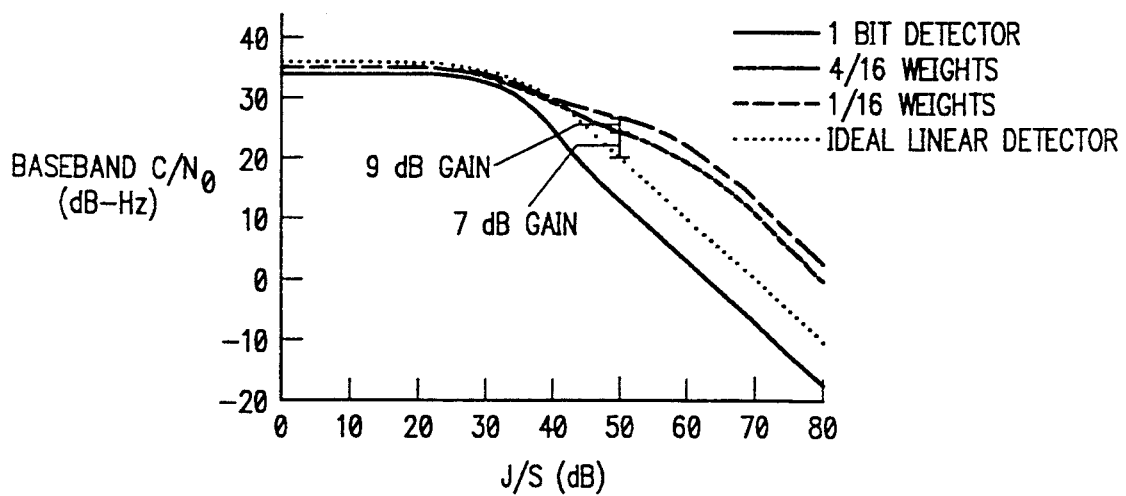

FIG. 5 shows the performance gain using this detector approach. At a CW jammer-to-signal ratio (J/S) of 50 dB, the detector using 4/16 weighting preserves 7 dB of additional signal, compared to a linear detector and 9 dB using the 1/16 weighting. The receiver uses this increase in signal power to operate despite much more CW interference.

Figure 6:
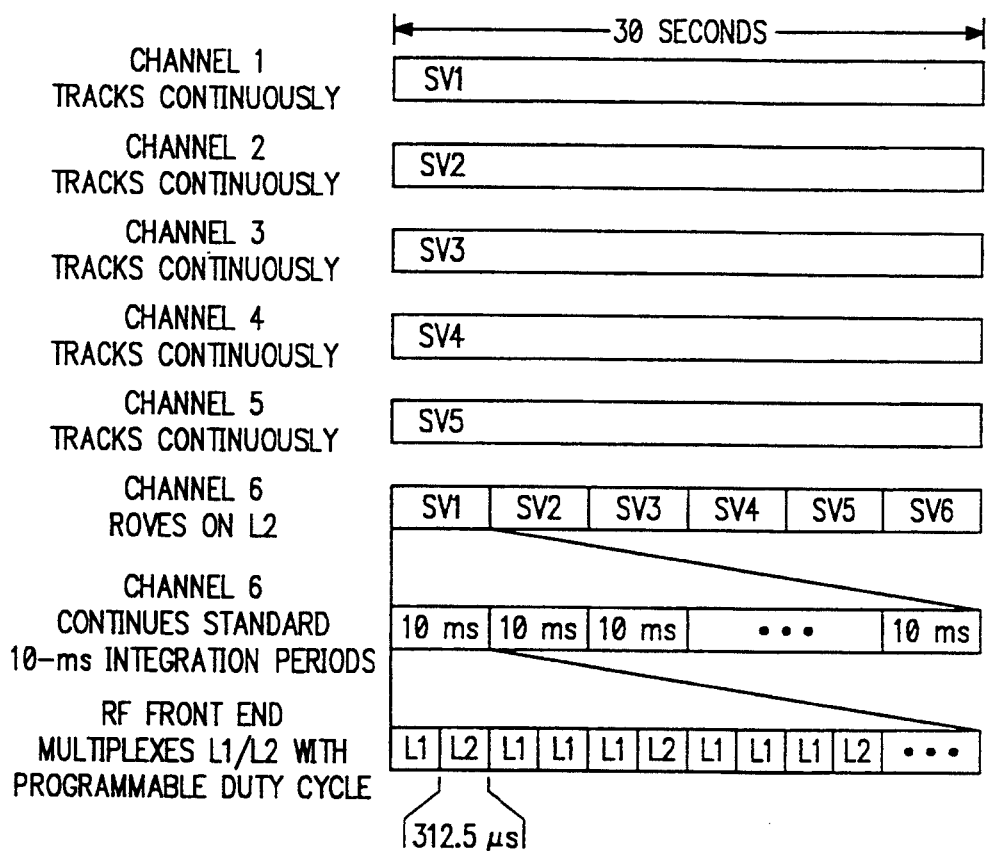
FIG. 6 shows one configuration of the receiver timing.

FIG. 6 shows one common version of the receiver timing which demonstrates the flexibility of six hardware channels by tracking combinations of L1 and L2 simultaneously. This mode will have five channels tracking L1 continuously and one channel roving on L2 across the five signals at least once every 30 seconds. By selecting the L1/L2 duty cycle in software, the receiver can easily be tailored for the unique conditions of future applications.

Figure 7:
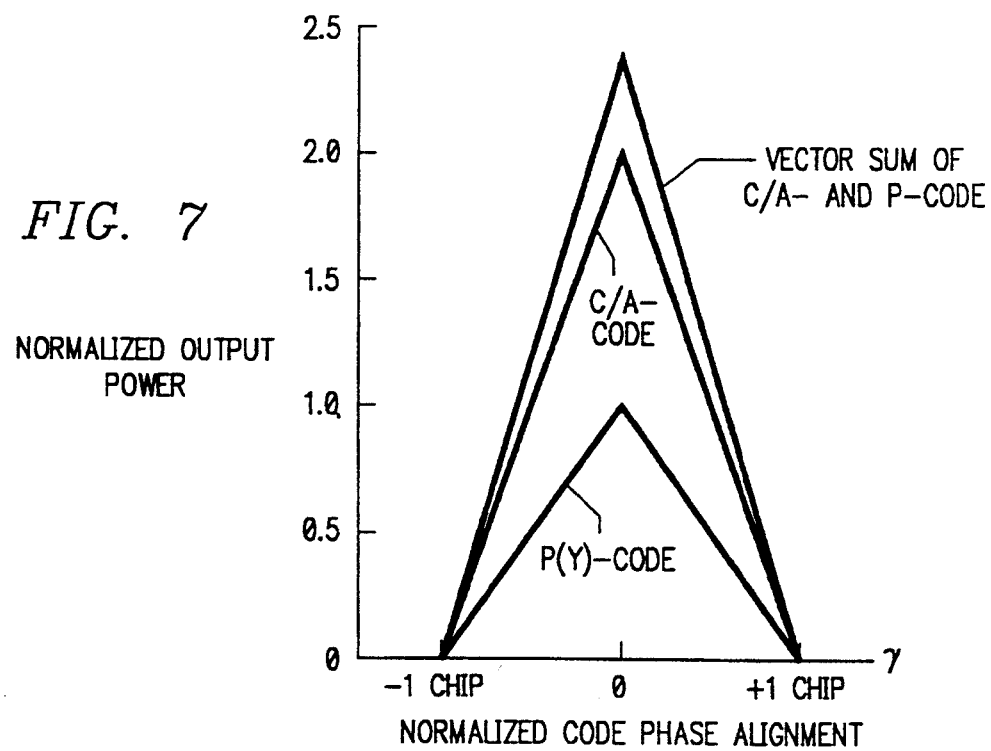
FIG. 7 shows the chart of sensitivity by combining C/A and P(Y)-code measurements.

FIG. 7 shows the signal sensitivity gain by simultaneously tracking and vector summing the C/A and P(Y)-code signals from a single satellite.

The C/A and P(Y)-code signals were combined inside the receiver to create 4.5 dB additional signal power when compared to P(Y)-code alone. The receiver can use this extra power against broadband jammers or beneath thick foliage. The satellite transmits the C/A-code with 3 dB more power than P(Y)-code to assist acquisition by receivers. But, before a conventional receiver can establish steady-state P(Y)-code track, it suspends tracking C/A-code. This receiver implementation removes that deficiency.

FIG. 7 illustrates the relative signal strengths of C/A, P(Y), and C/A plus P(Y)-code. Both C/A and P(Y)-code signals are demodulated separately using the extra correlators in the PCOAC. Then software adds the two signals together and forms a composite vector sum. Because there is no correlation between the broadband noise of the two signals, the composite signal is 4.5 dB stronger than the P(Y)-code signal.

Returning briefly to FIG. 3, the receiver employs a fast multiplexing or switching technique between the L1 and L2 signals as shown. Note that both L1 and L2 enter hybrid circuit 302, but only one signal comes out. That is because the channels are capable of quickly switching between L1 code state and carrier phase and L2 code state and carrier phase. This preserves a single signal path for L1 and L2 having the effect that there is no interchannel bias between L1 and L2 and no interchannel bias between any of the channels. This technique also allows us to build a full function receiver with only a single RF signal path and a single A/D converter, thus eliminating at least 50 percent of the expensive RF circuitry required for a GPS receiver. The RF switch is a conventional switch, but this technique is made possible because channels 202, 203 and 204 are capable of switching from a single code state and carrier phase to a different code state and carrier phase very quickly unlike conventional receiver architectures.

Figure 8:
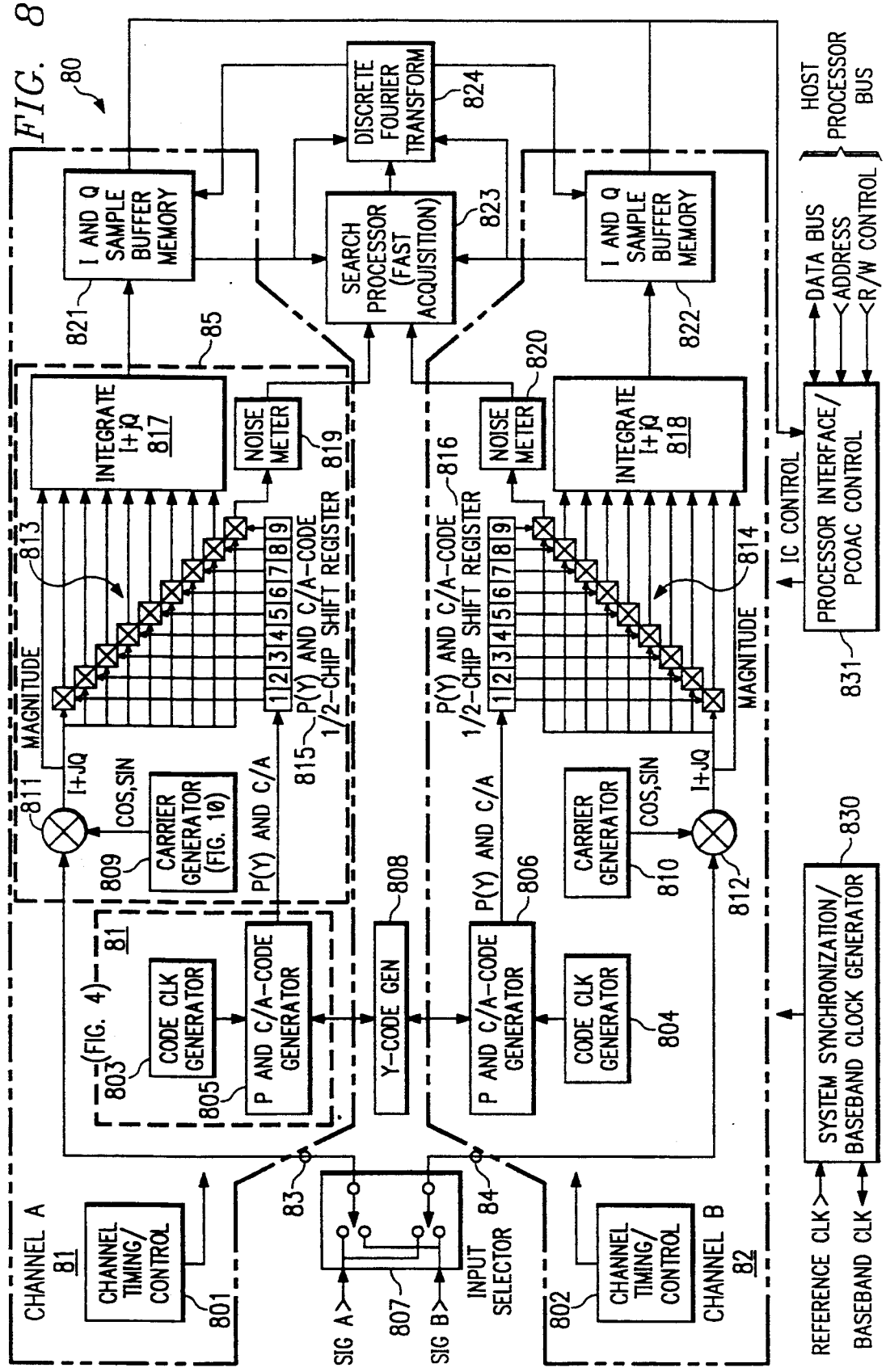
FIG. 8 shows a block diagram of two channel chips used in the receiver.

FIG. 8 is a block diagram of dual channel decoder 202, which is detailed in the above-identified copending patent application U.S. Ser. No. 07/663,968 entitled "Method and System for a Multi Channel and Search Global Position System Signal Processor." The details of operation of that system will not be repeated herein.

FIG. 9 represents pictorially the problem inherent with determining position from a series of satellites. There are two main requirements to track a satellite's transmitted signal. One is to determine the code state (C/A-code or P(Y)-code) of the signal being received. The second is to determine the doppler effect (frequency offset) of the signal being received. The code changes are akin to two people talking next to each other. Whatever the speaker says, the hearer receives at the exact same time. However, if the speaker were to move away far enough, the speaker would output information, and that information would arrive at the receiving person sometime later. Thus, if the speaker were reciting the alphabet, A, B, C, D in order, the receiver might be listening to the letter "A" while the sender is speaking the letter "C". This is called the code being received. By knowing the delay, i.e., the number of bits different in the transmitted information, one could figure out the distance, and thus the position of the receiver along a single straight line from the sender or satellite. This repetition from three other satellites yields precise position and time of the receiver.

In addition, the relative velocity between the satellite and the receiver is translated into a doppler shift in frequency of the transmitted carrier signal. Therefore, initial acquisition of a GPS signal from a single satellite is akin to a two dimensional problem where one dimension is the code or position state and the other dimension is the doppler or velocity state. The problem can then be described graphically in three dimensions (FIG. 9). Samples of the incoming signal are integrated in time across the eight correlators within each channel. The results of the sampling are stored at intervals of $T_i/8$ where $T_i$ is the total integration time. This is shown in the code/time plane. Then, via an eight point discrete fourier transform and adjacent doppler bin interpolation, this is converted to 13×8 samples in the code/frequency domain. Thus in a single search time, the receiver can determine the existence or absence of signal in many more code and doppler states than are possible with a conventional receiver.

FIG. 9, for comparison, shows the search area 901' and 902' covered per channel and per integration time by two prior generation receivers 901 and 902. Note that the code/frequency area search for both is a one dimensional search per channel and per integration time. This unique approach not only searches a larger area, but is a two dimensional search per channel per integration time. In other words, where a conventional receiver with eight correlators per channel would have looked through from two to eight possible locations of code and carrier, this receiver would have looked for 8×13 possible positions on the search plane/per channel. This can be likened to a child's battleship game, where a conventional receiver would have had up to eight chances to find the battleship while this receiver will have 8×13 chances to find the battleship each time it gets a turn.

Returning briefly to FIG. 8, noise meter 819 is tied to the ninth correlator in each channel. It has a high sampling rate tied to the DFT samples for search. It is programmable for C/A and P(Y)-code bandwidths and is capable of aiding search by setting the thresholds in the search processor for the Tong detectors. This is done without aiding or intervention or time line requirements from the computer.

FIG. 10A shows a typical noise meter, and FIG. 10B shows the predetection integration sampling associated with predetection integrator 1005 for the P(Y)-code and C/A code for three different frequency plans. The noise meter measures the variance of integration samples. The noise meter consists of three major components:
- a pre-detection integrator 1005
- a power discriminator 1006
- a post-detection integrator 1007.

The pre-detection integration period determines the bandwidth over which noise power is measured and is normally set to roughly match the bandwidth of the code being received. Taking absolute values provides a discriminant for the variance of I and Q. Post-detection integration acts as an averaging process to improve the quality of the noise power estimate. The noise meter can measure the power of gaussian, CW or plus noise.

The pre-detection integration period determines the noise power bandwidth. For normal operation, the bandwidth is set to match the bandwidth of the desired code (i.e., 10 MHz for P(Y)-code and 1 MHz for C/A-code). Pre-detection integration band width is equal to:

$$\frac{1}{\text{pre-detection integration period}} \quad [1]$$

For tracking operations, the noise meter post-detection integration period is the same as the sample integration period. During search, the noise meter post-detection integration period is the same as the DFT period.

Pre-detection integration samples are accumulated for the entire post-detection integration period.

Variance of I and Q integration samples in a gaussian noise environment is calculated using the following equation:

$$\text{VAR}_{iq} = 0.0783321 \times \frac{N + 4}{(M \times N)^{0.5}} \times \text{DATA}_{nm} \quad [2]$$

where $\text{VAR}_{iq}$ is the variance of the I and Q integration samples, N is the pre-detection integration period, M is the number of reference clocks in the post-detection integration period, and $\text{DATA}_{nm}$ is the noise meter data. Note, there is a four reference clock dead time between pre-detection integration samples.

The expected value of noise meter data in a gaussian noise environment is calculated using the following equation:

$$\overline{\text{DATA}_{nm}} = 0.0249339 \times \frac{N^{0.5} \times M}{N + 4} \times \text{SIG}_{std} \quad [3]$$

where $\overline{\text{DATA}_{nm}}$ is the expected value (mean) and $\text{SIG}_{std}$ is the standard deviation of the incoming signal. Variance of noise meter sample data is calculated using the following equation:

$$\text{VAR}_{nm} = 0.363380 \times \frac{M \times N}{N + 4} \times \text{SIG}_{std}^2 \quad [4]$$

where $\text{VAR}_{nm}$ is the variance.

For measuring gaussian noise, modulating P(Y)-code onto the incoming signal prior to pre-detection integration has a negligible effect on noise meter data. However, if the noise has some CW content, modulating P(Y)-code onto the incoming signal prior to pre-detection integration reduces the effect CW noise has on final post-detection values. The noise meter is also capable of measuring CW and/or pulse noise.

FIG. 8 shows the search engine works with the noise meter, the DFT, and the I and Q samples. First, I and Q samples from the eight correlators are stored in I and Q sample buffering memory 821. (I and Q means inphase and quadrature, which are the two phases which define a vector.) Once stored in memory, the DFT module 824 reads these samples out, applies the appropriate multiply vectors to each sample and adds the product to the accumulated value for each of the seven frequency bins.

After a DFT cycle is complete, the search processor 823 will go and read the samples and apply a Tong detect algorithm to them to determine if signal is present at a particular code state and carrier frequency.

Figure 11:
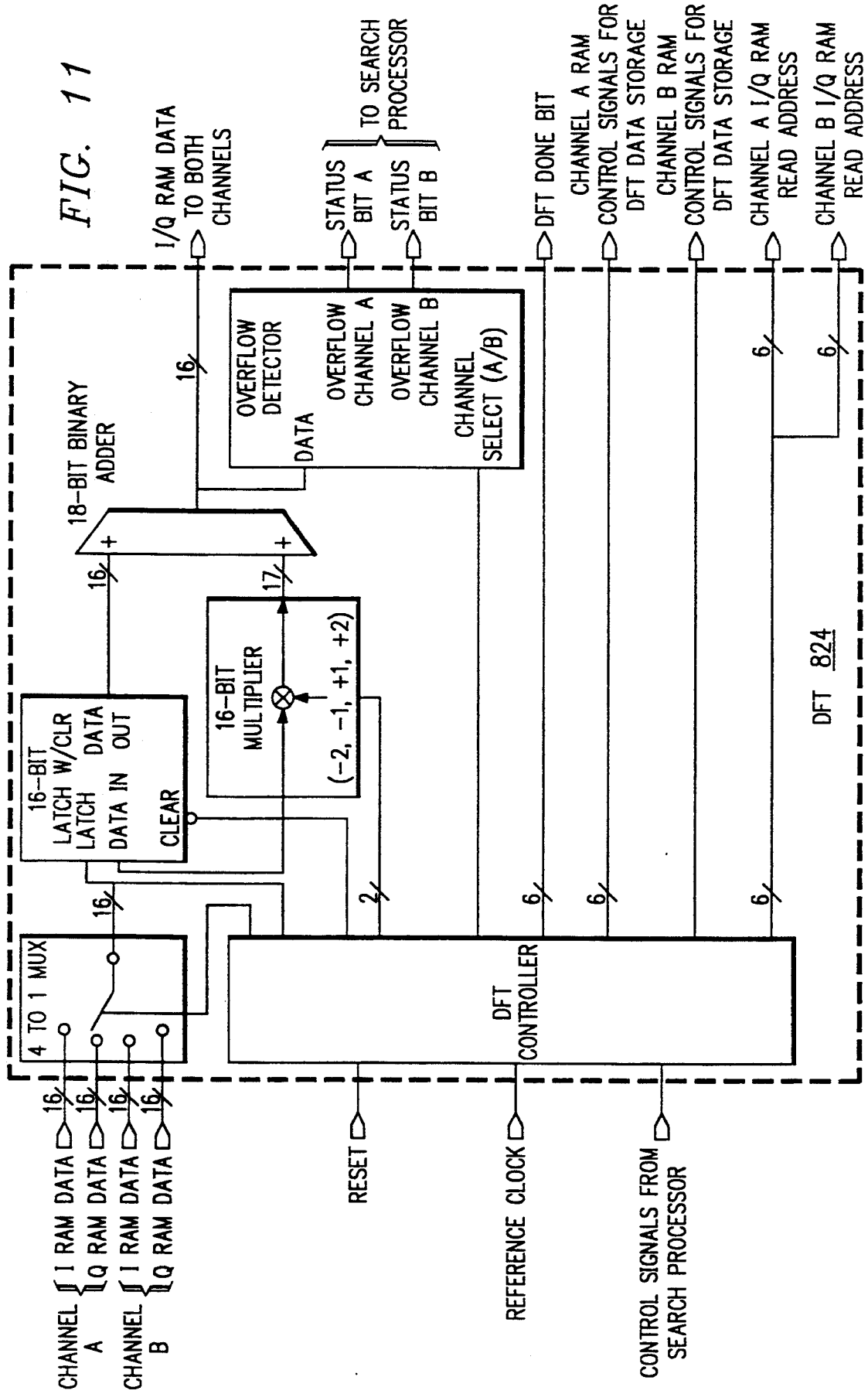
FIG. 11 shows a block diagram of one embodiment of a discrete fourier transformer (DFT) system.
Figure 13:
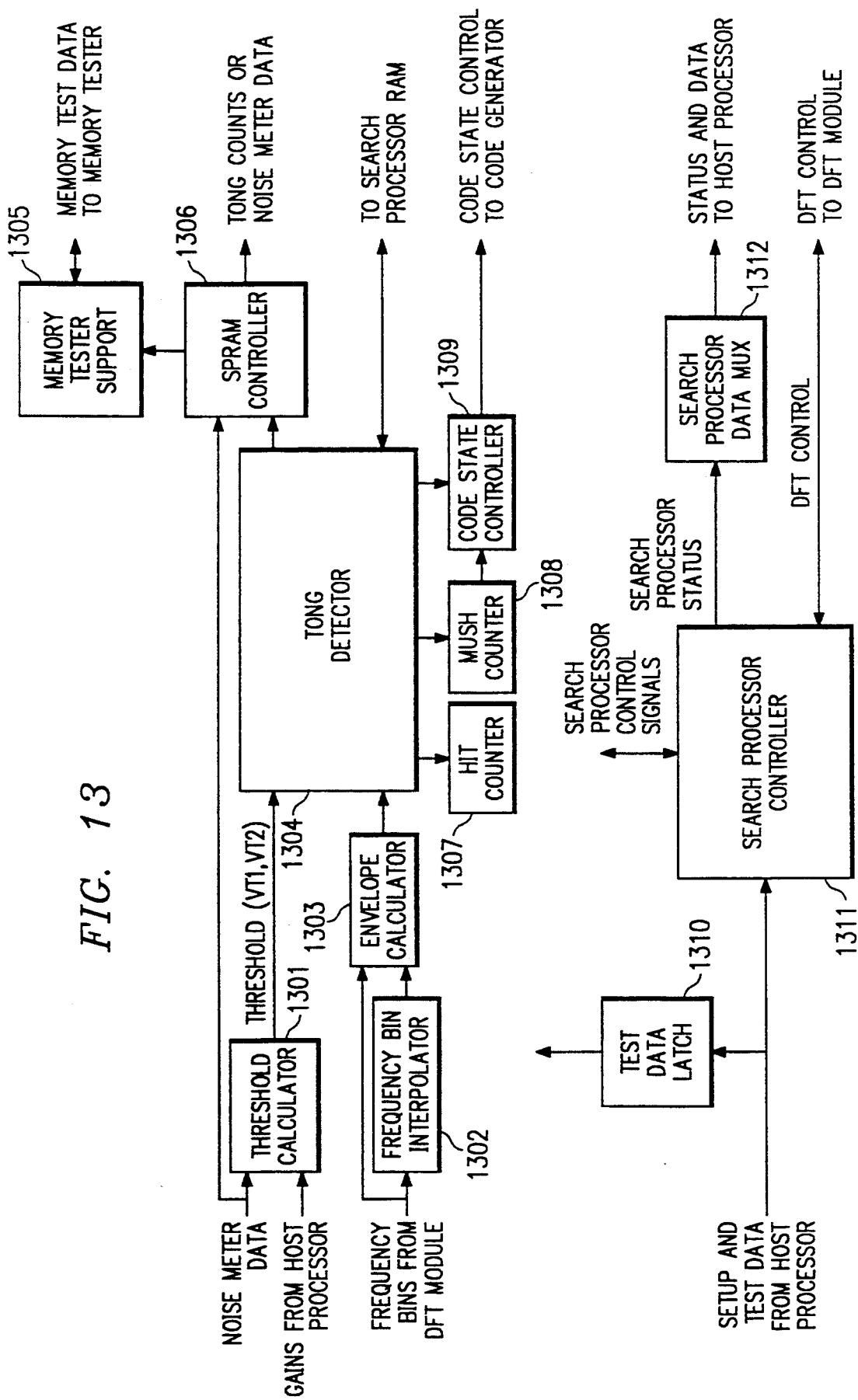
FIG. 13 shows a block diagram of the search processor.

DFT module 824 is shown in FIG. 11 and uses an approximation of the standard eight-point DFT algorithm to process sample integration data into seven frequency bins based on a complex 2-bit vector set. As a pre-processor to search processor module 823 (FIG. 8), DFT module 824 extends the frequency range of a search by up to a factor of seven, thus reducing search time in most applications.

The approximate DFT algorithm differs from the standard eight-point DFT algorithm only by the vector set that is used. The approximate vector set is used to reduce the circuitry required for implementation.

FIG. 12 shows the vector set, [$V_0$, $V_1$, $V_2$, $V_3$, $V_4$, $V_5$, $V_6$, and $V_7$], used for this approximate DFT algorithm.

This algorithm can also be expressed using the following matrix multiple equation:

$$\begin{bmatrix} B_6 \\ B_8 \\ B_{10} \\ B_{12} \\ B_0 \\ B_2 \\ B_4 \end{bmatrix} = \begin{bmatrix} V_0 & V_0 & V_0 & V_0 & V_0 & V_0 & V_0 & V_0 \\ V_0 & V_1 & V_2 & V_3 & V_4 & V_5 & V_6 & V_7 \\ V_0 & V_2 & V_4 & V_6 & V_0 & V_2 & V_4 & V_6 \\ V_0 & V_3 & V_6 & V_1 & V_4 & V_7 & V_2 & V_5 \\ V_0 & V_5 & V_2 & V_7 & V_4 & V_1 & V_6 & V_3 \\ V_0 & V_6 & V_4 & V_2 & V_0 & V_6 & V_4 & V_2 \\ V_0 & V_7 & V_6 & V_5 & V_4 & V_3 & V_2 & V_1 \end{bmatrix}^{[Z_0 \ldots Z_7]} \quad [5]$$

where $Z_n$ represents the complex value $I_n + jQ_n$. Thus, a set of eight integration samples ($Z_0$, $Z_1$, $Z_2$, $Z_3$, $Z_4$, $Z_5$, $Z_6$ and $Z_7$) are multiplied by a vector sequence producing frequency data for a given frequency bin.

The output level associated with each doppler bin is affected by doppler attenuation. Attenuation increases as signal offset from the internal generated carrier center frequency increases. The result is a non-linear distribution over the full range of the eight-point DFT output. In addition to the seven frequency bins produced by the DFT module, the search processor module generates six frequency bins by interpolating between the seven bins generated by the DFT module. This provides a means of filling in the signal to noise ratio holes between frequency bins.

Search processor 823 (FIG. 8) controls the DFT circuitry. A discrete fourier transform is performed on the I and Q data sample integration set. Frequency data from the DFT consists of seven I and Q pairs (representing seven doppler bins). The search processor interpolates between adjacent pairs of doppler bin data to obtain six additional doppler bins for a total of thirteen doppler bins for each of the correlators. A Tong detection algorithm is performed on this data to determine if a signal is present. If not, the search processor moves code to a new code state and continues the search there. The search continues until one of three conditions exist: a signal is found, the maximum search length (specified by the host processor) is reached, or an error condition occurs. Except for setup, the search processor operates independent of the resident computer.

The seven frequency bins from the DFT are labelled $B_0$, $B_2$, $B_4$, $B_6$, $B_8$, $B_{10}$ and $B_{12}$ from the most positive to the most negative doppler, respectively. The search processor interpolates between these frequency bins providing bins $B_1$, $B_3$, $B_5$, $B_7$, $B_9$ and $B_{11}$. These interpolated frequency bins indicate signal power found at a center frequency which is the arithmetic mean of the center frequencies of the even frequency bins from which it was interpolated.

$$(I+jQ)_{n+1} = (I+jQ)_n - (I+jQ)_{n+2} \quad [6]$$

where n = 0, 2, 4, 6, 8, and 10.

Interpolation by way of the above equation means that odd doppler bins (interpolated values) will on average have a magnitude 1.414 times that of the magnitude of the even doppler bins. For this reason the search threshold used for Tong detection interpolated bins is 1.414 times the threshold for non-interpolated bins.

Search processor 823 calculates envelopes for each complex (I+jQ) doppler bin value. Ideally, envelopes would be calculated as the square root of the sum of the squares; however, in order to significantly reduce circuit complexity a Robertson approximation is used as follows:

if $[I] \leq [Q]$ then $E = [Q] + [I]/2$,                 [7]

if $[I] > [Q]$ then $E = [I] + [Q]/2$ where [ ] indicates absolute value and E is the resultant envelope.

Several factors of the configuration contribute to final envelope magnitude and standard deviation and channel C/No loss.

Figure 14:
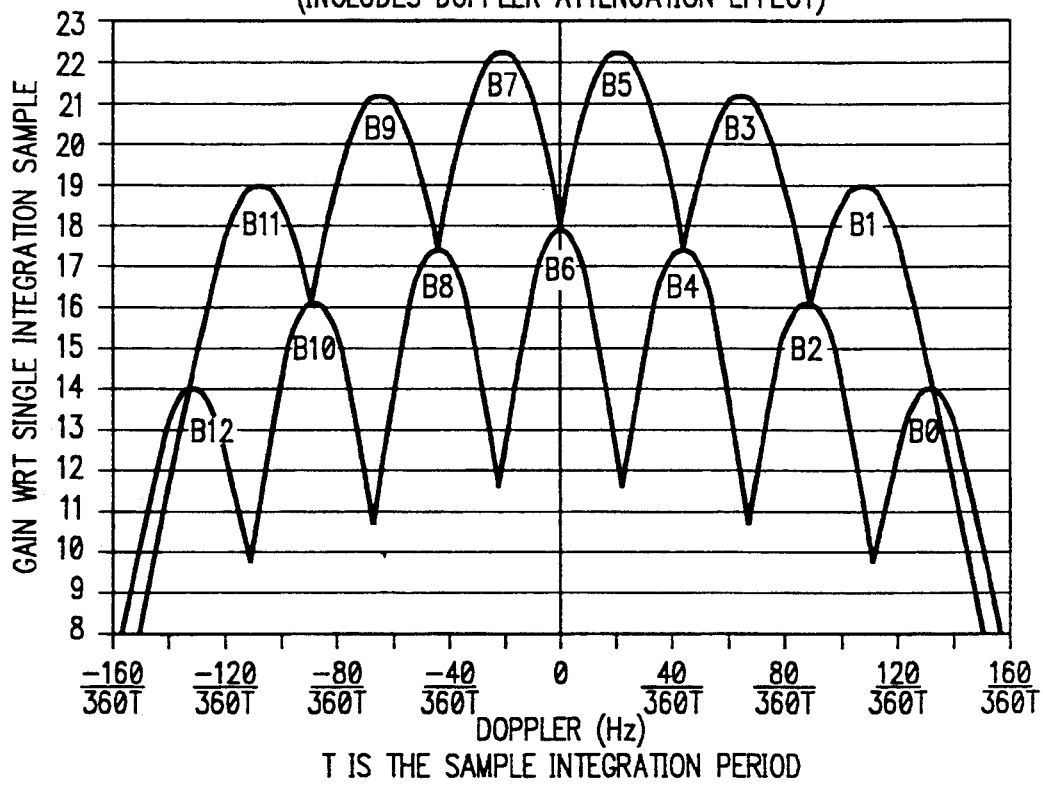

FIG. 14 shows gain of each DFT bin relative to the magnitude of the sample integration data.

Figure 15:
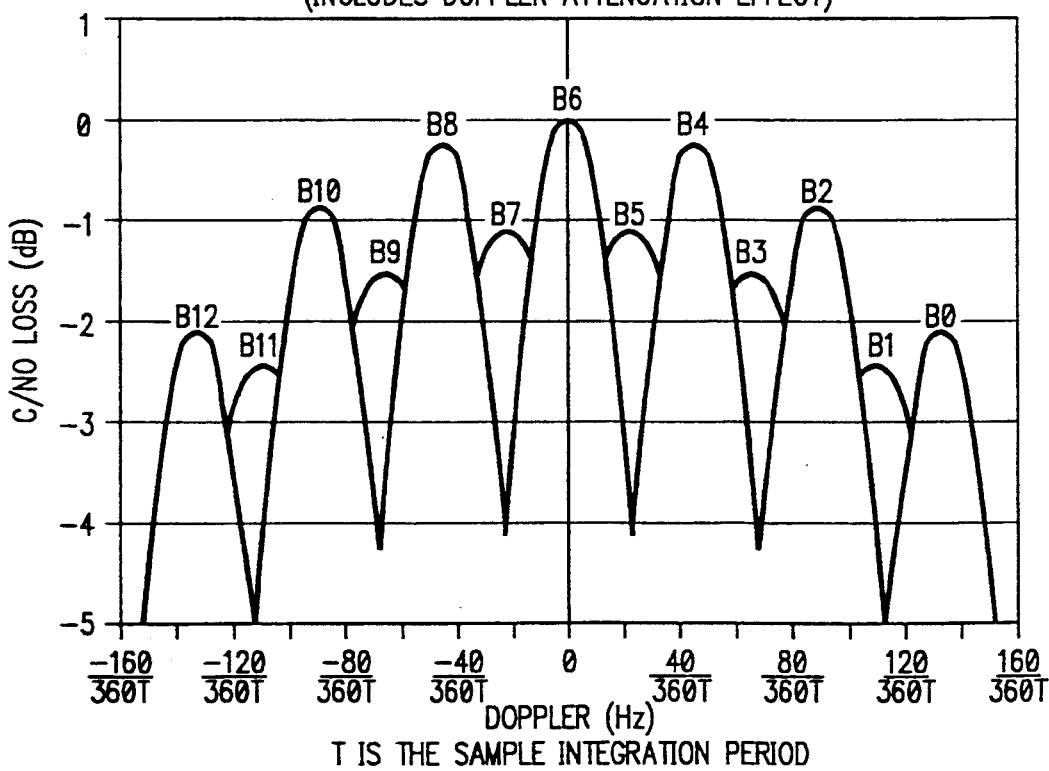

FIG. 15 shows C/No loss for each doppler bin as a function of doppler. The effect of doppler attenuation is factored into the values shown on this FIGURE. Doppler attenuation is loss which occurs because the final signal IF does not exactly match the carrier generator digital oscillator frequency.

FIG. 16 shows the effect each stage of signal correlation has on C/No and envelope magnitude and standard deviation. These factors are useful for determining C/No loss, determining if envelopes will overflow, and for setting search threshold ($V_{t1}$).

For example, if carrier hard-limiting is off, adjacent correlator presuming is on, the integration clock period is 250 microseconds, and the frequency of the incoming signal is 1,000 Hz off the carrier generator. (See copending patent entitled "Method and System for a Dual Channel and Search Global Position System Signal Processor"). C/No loss is calculated as follows:

```
     −1.25 dB for adjacent correlator presuming
     −0.24 dB for envelope calculation
  +  −2.4 to −0.9 dB for doppler bin 10 (.25/250 µs = 1000 Hz)
  =  −3.9 to −2.4 dB total C/No loss
```
The maximum envelope magnitude can be calculated as follows:
    rms signal input voltage
        1.5 from the carrier generator
        1/512 from truncation
        14,448 from sample period (for reference clock = 57.792 MHz)
        1.09 from envelope calculation
  ×  16.1, the maximum signal gain of bin 10
  =  742.8 × rms signal input voltage This is valuable in determining if envelope calculations will overflow for a given set of conditions.

Noise variance will have a gain of:
    $SIG_{std}$, input noise voltage (1 sigma)
        1.5 from the carrier generator -continued

```
    1/512 from truncation
    120.2 from sample period (for reference clock = 57.792 MHz)
    1.15 from adjacent correlator presuming
    1.12 from envelope calculation
×   6.32 for even bins
=   2.87 ×SIG_std
```

Thus, for this set of conditions, 2.87 is the ratio of the standard deviation of noise of the envelope to the standard deviation of noise at the input of the PCOAC. This factor is useful for calculating search threshold, $V_{t1}$.

The $V_{t1}$ and $V_{t2}$ thresholds are used in the Tong detection algorithm in determining whether or not signal is present as discussed previously. The host processor can either set $V_{t1}$ and $V_{t2}$ at a fixed value or specify $V_{t1}$ and $V_{t2}$ to be calculated by multiplying the output of the noise meter by a specified gain ($G_t$). The reason there are two voltage thresholds is because the magnitudes of odd doppler bins are greater than the magnitudes of even doppler bins by a factor of the square root of two, also as discussed previously. $V_{t1}$ is used for even doppler bins and $V_{t2}$ ($V_{t1}$ multiplied by the square root of two) for odd doppler bins.

During search, the noise meter's post-detection integrations are continued until all DFT input samples are collected. The total integration period affects the magnitude of the final noise measurement. These equations were shown previously.

$V_{t1}$ is always calculated at the completion of each DFT by multiplying noise measurement by a gain value (G+) specified by the host processor or it is provided by the host processor directly.

The search processor calculates $V_{t2}$ by multiplying $V_{t1}$ by the square root of two.

Figure 17:
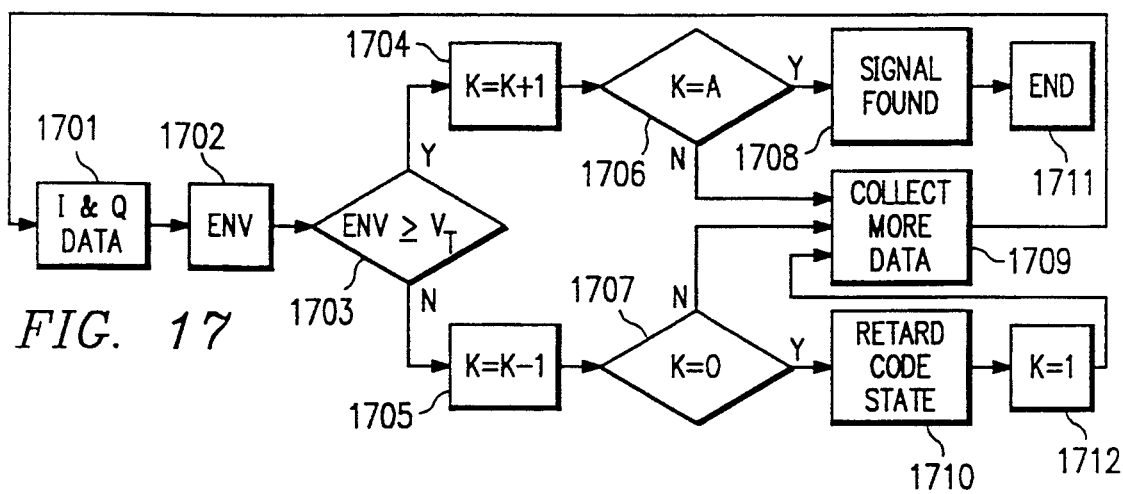
FIG. 17 shows an algorithm for the basic Tong detection function.

A diagram of the Tong detection algorithm is shown in FIG. 17. The Tong detection algorithm is designed to decide when signal is present. The Tong detector keeps a Tong count for each of the 104 (13 doppler bins times 8 correlators) search bins for which it is trying to determine if signal is present. Initially, the Tong count (K) is set to one 1712. The search processor 1703 compares each envelope 1702 to its appropriate threshold ($V_{t1}$ or $V_{t2}$). If the envelope is greater than or equal to the threshold, the Tong count for that search bin is incremented 1704. If the envelope is less than the threshold, the Tong count is decremented 1705. When a Tong count for a search bin reaches zero 1707, the signal at that search bin is declared "not found" and that search bin is no longer active. (Tong detection is no longer performed on it). If all 104 Tong counts reach zero, the signal is declared "not found" for all search bins at the current code state. When this occurs, the code is retarded 1710 to a new code state. The Tong detector is reset 1712 (all Tong counts are set to 1) and search continues. Signal is declared "found" 1708 if a Tong count is incremented to the value "A" 1706 set by the host processor.

For some applications it may be desirable for the search processor to ignore the envelopes from certain correlators or for certain frequency bins. The search processor provides the host processor the means with which to mask the unwanted correlators or frequency bins.

A search that is in progress can be temporarily suspended. This might be done in the event that the host processor has determined the input signal to be no good, such as when a pulse jammer is detected. Search suspend is tied to DFT cycles. Tong detection is not performed on DFT data which was taken during search suspend. Once suspend is de-asserted, Tong detection resumes on data from the next DFT cycle.

Each channel has a (hardware) suspend search input. The host processor enables and disables the suspend input for a channel by setting a suspend input enable bit. In addition, the host processor can directly suspend search.

The search processor implements a mush counter which counts the number of DFT periods the search processor has spent on a particular code state. The purpose of the mush counter is to prevent the search processor from getting hung up at a particular code state because of a bad threshold, a jamming signal or high side-lobe. If the mush counter determines that the number of DFT samples spent on a particular code state is equal to a maximum mush count specified by the host processor, then the mush counter function can either halt search or force the search processor to go on to the next code state, depending on a bit set by the host processor.

The search processor also incorporates a hit counter which can be used by the host processor to aid in determining the adequacy of a threshold setting. It can also play a role in designs for non-gaussian environments. The hit counter only provides information to the host processor; it does not affect the operation of the search processor. The hit counter counts the number of hits for a specified number of DFT samples. It is incremented each time an active Tong count is incremented. Once the hit count is complete, it is transferred to a latch to be read by the host processor. The hit counter is cleared after the transfer to keep count of hits for the next set of DFT samples. A large hit count could be indicative of a low threshold.

Figure 18:
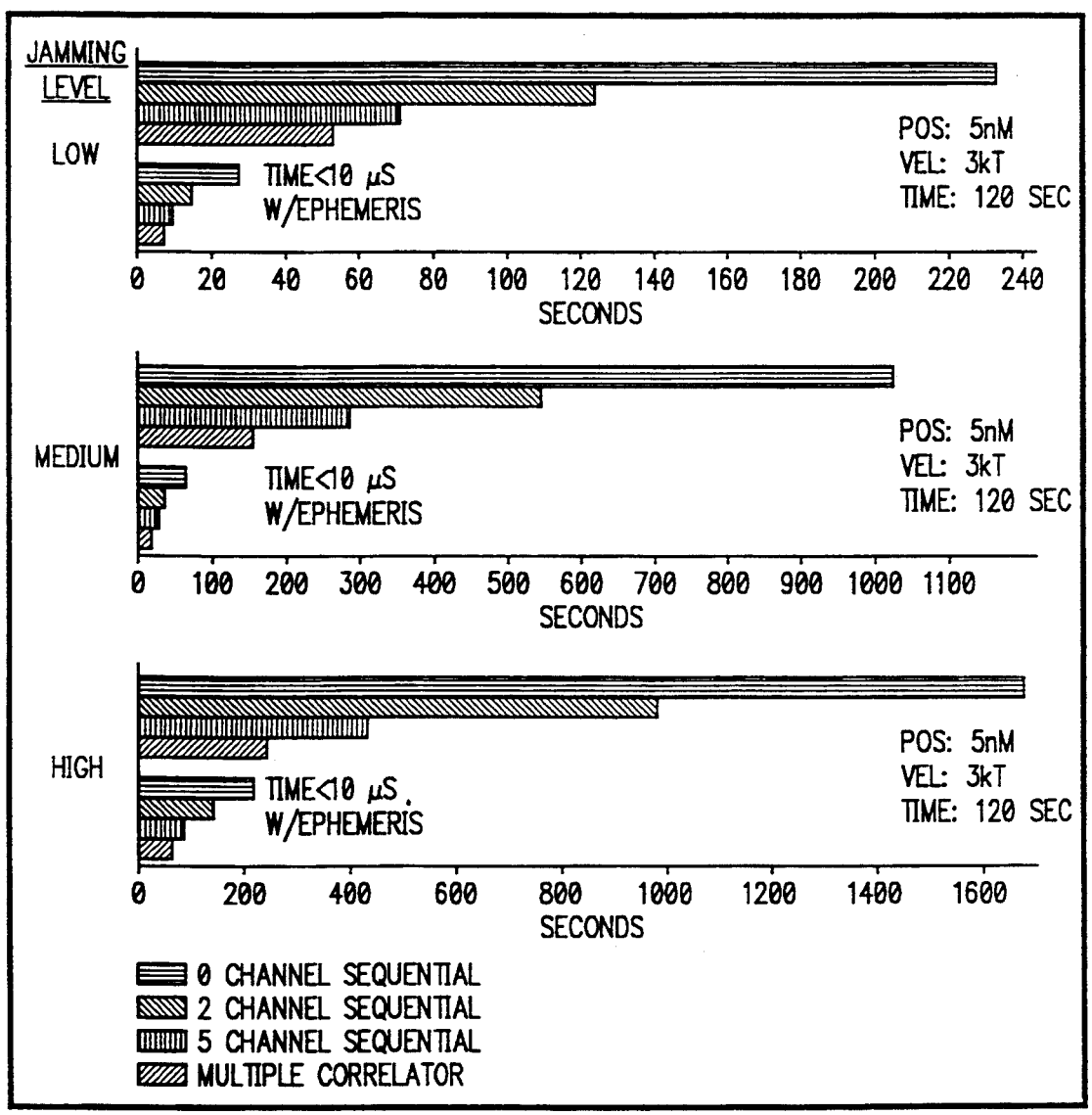
FIG. 18 shows a comparison chart of the various receivers and their relative performance.

FIG. 18 summarizes the performance of four different receiver architectures under various conditions of signal aiding and jamming levels. The metric used is time to first fix or the time from the point at which the receiver is turned-on until it is navigating to specified accuracy. In all cases the unique receiver architecture which is P(Y) described herein produces a system that gives the best performance independent of jamming level and independent of aiding quality.

It should be noted that the GPS Satellite System has in it an algorithm which converts the P-code to Y-code for special applications. This algorithm is not widely known. Therefore, only those receivers that have a special access to the algorithm can utilize Y-code.

In operation a special code called the CV code can be sent to the satellite via the GPS control segment and the satellite using its special algorithm, will then convert the P(y)-code signals to a Y-code signal. Receivers which have been outfitted with a special circuit which is available from the U.S. government, also in response to a corresponding CV code, will convert to a Y-code receiver. In this context CV code stands for cryptovariable. In prior receivers, there has been one AOC circuit for each channel. In the instant disclosure there is one AOC alternative circuit embedded in each dual channel chip. Therefore, the AOC alternative each services two channels. Accordingly, once the CV code has been received or inserted into the receiver, the receiver becomes a six channel Y-code receiver with only three AOC alternative circuits embedded therein. The AOC alternative, which is used in place of the standard AOC circuit available from the government, takes advantage of the fact that the circuitry is shared between two channels and that by being embedded in the same chip with the search processor it can support the high code chipping rates of 28 megahertz and also the stopping of the code associated with search code state advances and retards. We do this by multiplexing a portion of the circuit.

Although this description describes the invention with reference to the above specified embodiments, the claims and not this description limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A receiver for acquiring and tracking analog spread spectrum signals, each signal having an analog carrier signal modulated with data and pseudorandom noise codes, comprising:
    a downconversion circuit for downconverting the analog spread spectrum signal to an analog downconverted spread spectrum signal at a frequency sufficiently low enough for digitization;
    a local clock generation circuit coupled to said downconversion circuit for generating a sample clock frequency to produce said analog downconverted spread spectrum signal and providing control signals for the receiver;
    a sampling circuit for converting said analog downconverted spread spectrum signal to a digital spread spectrum signal;
    a plurality of channel processing circuits for demodulating said digital spread spectrum signal to obtain actual code and carrier phase information, each channel processing circuit generating an estimated code and carrier phase and comparing said estimated code and carrier phase to said actual code and carrier phase, each channel processing circuit including correlators for generating predetection integration data in response to said comparison;
    a search processor which autonomously controls said plurality of channel processing circuits for searching and acquiring said analog spread spectrum signal; and
    a general purpose processor for overall receiver control.

2. The receiver set forth in claim 1, further comprising a fourier transform circuit for generating frequency bins from said predetection integration data in order to extend a doppler frequency range of search for said analog carrier signal.

3. The receiver set forth in claim 2, wherein said fourier transform circuit is a discrete fourier transform approximation circuit using two-bit complex vectors.

4. The receiver set forth in claim 2, wherein said search processor includes circuitry for interpolating new frequency bins from said frequency bins of said fourier transform circuit.

5. The receiver set forth in claim 1, wherein said search processor employs a Tong detection algorithm for determining signal acquisition at a particular code state for a predetermined search threshold.

6. The receiver set forth in claim 5, further comprising a noise meter for dynamic setting of said search threshold.

7. The receiver set forth in claim 6, wherein said noise meter has a programmable bandwidth.

8. The receiver set forth in claim 5, wherein said search processor includes a mush counter for limiting a number of passes through said Tong detection algorithm and forces signal acquisition to continue at a new code state after a specific number of passes have been performed at said particular code state.

9. The receiver set forth in claim 5, wherein said search processor includes a mush counter for limiting a number of passes through said Tong detection and forces signal acquisition to stop after a specific number of passes have been performed.

10. The receiver set forth in claim 1, wherein said search processor includes a hit counter for aiding in determination of the adequacy of a predetermined search threshold by counting the number of signal samples which exceed said predetermined search threshold for a given search duration.

11. The receiver set forth in claim 1, wherein said search processor includes circuitry for suspending signal acquisition in response to a period of time of known conditions of bad signal.

12. The receiver set forth in claim 2, wherein said search processor employs a Tong detection algorithm on said frequency bins, said search processor including frequency bin mask bits which exclude certain frequency bins from being considered in said Tong detection algorithm.

13. The receiver set forth in claim 5, wherein said search processor includes correlator mask bits which exclude certain correlators from being considered in said Tong detection algorithm.

14. The receiver set forth in claim 2, wherein said search processor implements a Robertson approximation for generating envelopes for each of said frequency bins.

15. The receiver of claim 14, wherein said search processor employs a Tong detection algorithm on said frequency bins, said Tong detection algorithm comparing said envelopes to a predetermined search threshold for determining signal acquisition.

16. The receiver of claim 1, wherein said search processor processes a plurality of code states simultaneously.

17. The receiver set forth in claim 6, wherein said search processor includes a threshold calculator that adjusts said search threshold in response to an output from said noise meter.

18. The receiver set forth in claims 4, wherein said search processor includes a threshold calculator that adjusts said search threshold in response to an output from said noise meter, said search processor includes a second threshold calculator corresponding to said interpolated fourier transform frequency bins, said second threshold calculator generating a second threshold which is the square root of two greater than said search threshold of said threshold calculator.

19. The receiver of claim 1, wherein said search processor circuitry is embedded with said plurality of channel processing circuits on a single monolithic circuit.

20. A receiver for acquiring and tracking analog spread spectrum signals from a plurality of satellites, each satellite transmitting analog L1 and L2 carrier signals modulated with data and pseudorandom noise codes, comprising:
    a downconversion circuit for downconverting the analog spread spectrum signals to analog carrier downconverted spread spectrum signals at a frequency sufficiently low enough for digitization;

a local clock generation circuit coupled to said downconversion circuit for generating a sample clock frequency to produce said analog downconverted spread spectrum signals and for providing control signals for the receiver;

a sampling circuit for converting said analog downconverted spread spectrum signals to digital spread spectrum signals;

a plurality of continuous channel processing circuits for demodulating said digital spread spectrum signals to obtain actual code and carrier phase information, each continuous channel processing circuit generating an estimated code and carrier phase and comparing said estimated code and carrier phase to said actual code and carrier phase, each continuous channel processing circuit having correlators for generating predetection integration data in response to said comparison, each continuous channel processing circuit assigned to a separate satellite;

a plurality of rover channel processing circuits for demodulating said digital spread spectrum signals to obtain actual code and carrier phase information, each rover channel processing circuit generating an estimated code and carrier phase and comparing said estimated code and carrier phase to said actual code and carrier phase, each rover channel circuit roves one L-band signal of a plurality of satellites while each continuous channel processing circuit continuously tracks the other L-band signal of a specific satellite; and a general purpose processor for controlling said continuous and rover channel processing circuits during signal acquisition and tracking.

21. A receiver for acquiring and tracking analog spread spectrum signals from a plurality of satellites, each satellite transmitting analog L1 and L2 carrier signals modulated with data and pseudorandom noise codes, comprising:

a downconversion circuit for downconverting the analog spread spectrum signals to analog downconverted spread spectrum signals at a frequency sufficiently low enough for digitization;

a local clock generation circuit coupled to said downconversion circuit for generating a sample clock frequency to produce said analog downconverted spread spectrum signals and for providing control signals for the receiver;

a sampling circuit for converting said analog spread spectrum downconverted signals to digital spread spectrum signals;

a plurality of continuous channel processing circuits for demodulating said digital spread spectrum signals to obtain actual code and carrier phase information, each continuous channel processing circuit generating an estimated code and carrier phase and comparing said estimated code and carrier phase to said actual code and carrier phase, each continuous channel processing circuit having correlators for generating predetection integration data in response to said comparison, each continuous channel processing circuit assigned to a separate satellite;

a plurality of rover channel processing circuits for demodulating said digital spread spectrum signals to obtain actual code and carrier phase information, each rover channel processing circuit generating an estimated code and carrier phase and comparing said estimated code and carrier phase to said actual code and carrier phase, each rover channel circuit roves a remaining plurality of visible satellites; and a general purpose processor for controlling said continuous and rover channel processing circuits during signal acquistion and tracking.

22. A receiver for acquiring and tracking analog spread spectrum signals, each signal having an analog carrier signal modulated with data and pseudorandom noise codes, comprising:

a downconversion circuit for downconverting the analog spread spectrum signal to an analog downconverted spread spectrum signal at a frequency sufficiently low enough for digitization;

a local clock generation circuit coupled to said downconversion circuit for generating a sample clock frequency to produce said analog downconverted spread spectrum signal and for providing control signals for the receiver;

a sampling circuit for converting said analog downconverted spread spectrum signal to a digital spread spectrum signal;

a plurality of channel processing circuits for demodulating said digital spread spectrum signal to obtain actual code and carrier phase information, each channel processing circuit generating an estimated code and carrier phase and comparing said estimated code and carrier phase to said actual code and carrier phase, each channel processing circuit having correlators for generating predetection integration data in response to said comparison, each channel processing circuit including a noise meter for setting thresholds to assist in signal acquisition and tracking; and a general purpose processor for controlling said channel processing circuits during signal acquisition and tracking.

23. The receiver of claim 22, wherein said noise meter measures gaussian, continuous wave or pulse noise.

24. The receiver of claim 22, wherein said noise meter is programmable to a desired pseudorandom noise bandwidth.

25. A receiver for acquiring and tracking analog spread spectrum signals, each signal having an analog carrier signal modulated with data and pseudorandom noise codes, comprising:

a downconversion circuit for downconverting the analog spread spectrum signal to an analog downconverted spread spectrum signal at a frequency sufficiently low enough for digitization;

a local clock generation circuit coupled to said downconversion circuit for generating a sample clock frequency to produce said analog downconverted spread spectrum signal and providing control signals for the receiver;

a sampling circuit for converting said analog downconverted spread spectrum signal to a digital spread spectrum signal;

a plurality of channel processing circuits for demodulating said digital spread spectrum signal to obtain actual code and carrier phase information, each channel processing circuit generating an estimated code and carrier phase and comparing said estimated code and carrier phase to said actual code and carrier phase, each channel processing circuit including correlators for generating predetection integration data in response to said comparison, each channel processing circuit processing a P(Y) code and a C/A code simultaneously;

a general purpose processor for controlling said channel processing circuits during signal acquisition and tracking; and circuitry for performing vector summing of said P(Y) and C/A code for a single satellite to allow tracking of said P(Y) and C/A code with a single tracking loop.

* * * * *